(12) United States Patent
Ferri et al.

(10) Patent No.: US 10,933,713 B2
(45) Date of Patent: Mar. 2, 2021

(54) AIRFLOW CONTROL SYSTEM OF A WORK VEHICLE

(71) Applicant: CNH Industrial America LLC, New Holland, PA (US)

(72) Inventors: Doriano Ferri, Brussels (BE); Jigarkumar N. Patel, West Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 359 days.

(21) Appl. No.: 15/391,073

(22) Filed: Dec. 27, 2016

(65) Prior Publication Data

US 2018/0178617 A1 Jun. 28, 2018

(51) Int. Cl.
 B60H 1/00 (2006.01)
 F24F 11/00 (2018.01)
(52) U.S. Cl.
 CPC ..... B60H 1/00378 (2013.01); B60H 1/00828 (2013.01); B60H 1/00849 (2013.01); *F24F 2011/0004* (2013.01)
(58) Field of Classification Search
 CPC ............ B60H 1/00378; B60H 1/00849; B60H 1/00828; F04D 15/0066
 USPC ............................................................ 454/70
 See application file for complete search history.

(56) References Cited

U.S. PATENT DOCUMENTS

| | | | | |
|---|---|---|---|---|
| 3,361,341 A | * | 1/1968 | Laing ...................... | F04D 17/04 417/423.7 |
| 3,480,202 A | * | 11/1969 | Stephenson, Jr. ..... | F04D 17/162 415/98 |
| 4,039,267 A | * | 8/1977 | Baer ...................... | F04D 27/009 415/1 |
| 4,189,987 A | * | 2/1980 | Amberg ............. | B60H 1/00378 454/137 |
| 4,205,944 A | | 6/1980 | Rohrberg et al. | |
| 4,344,356 A | * | 8/1982 | Casterton ........... | B60H 1/00378 165/42 |
| 4,375,609 A | * | 3/1983 | Wolf ........................ | H02P 7/03 388/814 |

(Continued)

FOREIGN PATENT DOCUMENTS

| | | | | |
|---|---|---|---|---|
| DE | 102005045137 A1 | * | 4/2007 | .......... F04D 27/001 |
| EP | 1281543 | | 5/2003 | |

(Continued)

*Primary Examiner* — Edelmira Bosques
*Assistant Examiner* — Frances F. Hamilton
(74) *Attorney, Agent, or Firm* — Rickard K. DeMille; Rebecca L. Henkel (57) ABSTRACT

An airflow control system of a work vehicle includes a controller having a memory and a processor. During an initialization phase, the controller is configured to instruct a blower to operate at an initialization capacity to provide an airflow from an external environment into an interior of a cab of the work vehicle. The controller is also configured to receive a first signal indicative of a pressure within the interior of the cab and to determine a restriction factor based at least in part on the first signal. In addition, during an operation phase, the controller is configured to receive a second signal indicative of the pressure within the interior of the cab and to determine an input flow rate of the airflow from the external environment into the interior of the cab based at least in part on the restriction factor and the second signal.

12 Claims, 4 Drawing Sheets

(56) References Cited

U.S. PATENT DOCUMENTS

| | | | | |
|---|---|---|---|---|
| 4,467,706 A | * | 8/1984 | Batcheller | B01D 50/002 165/244 |
| 4,492,151 A | * | 1/1985 | Mattei | B60H 1/00378 236/94 |
| 4,581,988 A | * | 4/1986 | Mattei | B60H 1/00378 454/70 |
| 4,806,833 A | | 2/1989 | Young | |
| 4,978,896 A | * | 12/1990 | Shah | G05D 7/0676 236/DIG. 9 |
| 5,139,197 A | * | 8/1992 | Seshimo | F24F 3/044 236/49.3 |
| 5,228,306 A | * | 7/1993 | Shyu | F24F 1/027 62/176.6 |
| 5,391,111 A | * | 2/1995 | Girard | B60H 1/00 454/103 |
| 5,413,528 A | * | 5/1995 | Pabst | B60H 1/00828 454/141 |
| 5,447,414 A | * | 9/1995 | Nordby | F04D 27/00 417/20 |
| 5,647,793 A | * | 7/1997 | Mariaux | B60H 1/00371 454/103 |
| 5,736,823 A | * | 4/1998 | Nordby | G05D 7/0676 318/432 |
| 5,839,397 A | * | 11/1998 | Funabashi | B60K 11/04 123/41.01 |
| 5,895,319 A | * | 4/1999 | Matousek | B60H 1/00378 454/84 |
| 5,984,773 A | | 11/1999 | Gervais et al. | |
| 6,116,095 A | | 9/2000 | Radle | |
| 6,462,494 B1 | * | 10/2002 | Schone | F04D 27/004 318/433 |
| 6,504,338 B1 | | 1/2003 | Eichorn | |
| 6,768,423 B2 | * | 7/2004 | Doescher | B60H 1/00378 340/425.5 |
| 6,964,174 B2 | | 11/2005 | Shah | |
| 7,508,146 B2 | | 3/2009 | Simofi-Ilyes et al. | |
| 7,832,223 B2 | * | 11/2010 | Arshad | B60H 1/00735 165/202 |
| 8,424,776 B2 | | 4/2013 | Veettil et al. | |
| 8,672,733 B2 | * | 3/2014 | Chen | F24F 11/77 454/239 |
| 8,944,201 B2 | * | 2/2015 | Krellner | B60H 1/00378 165/42 |
| 9,188,508 B1 | * | 11/2015 | Meyer | G01M 99/005 |
| 9,200,995 B2 | * | 12/2015 | Ahola | G01N 15/082 |
| 2005/0006488 A1 | * | 1/2005 | Stanimirovic | F24F 11/89 236/49.1 |
| 2005/0247194 A1 | * | 11/2005 | Kang | B01D 46/0086 95/19 |
| 2008/0188173 A1 | * | 8/2008 | Chen | F24F 11/77 454/239 |
| 2010/0048118 A1 | * | 2/2010 | Klassen | B60H 1/00378 454/140 |
| 2010/0144261 A1 | * | 6/2010 | Barkic | B60H 1/00457 454/75 |
| 2012/0077426 A1 | | 3/2012 | Dage | |
| 2012/0125907 A1 | * | 5/2012 | Chernyavsky | B60H 1/00378 219/202 |
| 2012/0160446 A1 | * | 6/2012 | Creed | B60H 1/00207 165/41 |
| 2013/0197826 A1 | * | 8/2013 | Ahola | G01N 15/082 702/44 |
| 2014/0005841 A1 | * | 1/2014 | Cheng | G05D 7/0617 700/282 |
| 2014/0213171 A1 | * | 7/2014 | Sugimoto | F24F 7/007 454/256 |
| 2014/0378042 A1 | * | 12/2014 | Koberstein | B60H 1/249 454/70 |
| 2015/0354845 A1 | * | 12/2015 | Brown | F24F 13/10 165/237 |
| 2017/0073962 A1 | * | 3/2017 | Modera | E04B 1/66 |
| 2017/0268516 A1 | * | 9/2017 | Oppermann | F04D 1/00 |
| 2018/0178618 A1 | * | 6/2018 | Ferri | B60H 1/00378 |
| 2018/0178619 A1 | * | 6/2018 | Guitart Corominas | B60H 1/00378 |
| 2018/0257455 A1 | * | 9/2018 | Brooks | B60H 1/00821 |
| 2018/0264910 A1 | * | 9/2018 | Guerineau | B60H 1/00378 |
| 2019/0003491 A1 | * | 1/2019 | Lofy | F04D 29/703 |
| 2019/0314653 A1 | * | 10/2019 | Royle | F24F 11/0001 |

FOREIGN PATENT DOCUMENTS

| | | | |
|---|---|---|---|
| EP | 2381184 A1 | * 10/2011 | F24F 7/06 |
| EP | 2660085 A1 | * 11/2013 | B60H 1/00378 |
| JP | 03177743 A | * 8/1991 | |
| JP | 2004136804 A | * 5/2004 | |

* cited by examiner

AIRFLOW CONTROL SYSTEM OF A WORK VEHICLE

BACKGROUND

The present disclosure relates generally to an airflow control system of a work vehicle.

Certain work vehicles (e.g., tractors, harvesters, skid steers, etc.) include a heating, ventilation, and air condition (HVAC) system configured to control an airflow into a cab of the work vehicle. For example, the HVAC system may be configured to pressurize the cab to substantially reduce ingress of dirt and/or other contaminants into the cab, and/or to reduce noise within the cab. Accordingly, certain HVAC systems include an airflow sensor configured to monitor a flow rate of air from an external environment into an interior of the cab. Unfortunately, the airflow sensor may substantially increase the cost and complexity of the HVAC system, thereby increasing the total manufacturing cost of the work vehicle.

BRIEF DESCRIPTION

In one embodiment, an airflow control system of a work vehicle includes a controller having a memory and a processor. During an initialization phase, the controller is configured to instruct a blower to operate at an initialization capacity to provide an airflow from an external environment into an interior of a cab of the work vehicle at an output flow rate. The controller is also configured to receive a first signal indicative of a pressure within the interior of the cab and to determine a restriction factor based at least in part on the first signal. In addition, during an operation phase, the controller is configured to receive a second signal indicative of the pressure within the interior of the cab and to determine an input flow rate of the airflow from the external environment into the interior of the cab based at least in part on the restriction factor and the second signal. In addition, the controller is configured to instruct the blower and/or an airflow control assembly to control the airflow from the external environment into the interior of the cab based at least in part on the input flow rate. The airflow control assembly, upon receiving instructions from the controller, is configured to control the airflow from the external environment into the interior of the cab by adjusting a position of a door that controls mixing of external air from the external environment and recirculated air from the interior of the cab.

In another embodiment, an airflow control system of a work vehicle includes a blower configured to provide an airflow from an external environment into an interior of a cab of the work vehicle. The airflow control system also includes an airflow control assembly configured to control mixing of external air from the external environment and recirculated air from the interior of the cab based on a position of a door. In addition, the airflow control system includes a pressure sensor configured to fluidly couple to the interior of the cab of the work vehicle, and a controller having a memory and a processor. During an initialization phase, the controller is configured to instruct the blower to operate at an initialization capacity to output the airflow at an output flow rate, and the controller is configured to receive a first signal from the pressure sensor indicative of a pressure within the interior of the cab. In addition, the controller is configured to determine a restriction factor based at least in part on the first signal. In addition, during an operation phase, the controller is configured to receive a second signal from the pressure sensor indicative of the pressure within the interior of the cab and to determine an input flow rate of the airflow based at least in part on the restriction factor and the second signal. The controller is also configured to instruct the blower and/or the airflow control assembly to control the airflow based at least in part on the input flow rate, and the airflow control assembly, upon receiving instructions from the controller, is configured to control the airflow by adjusting the position of the door.

In a further embodiment, a method for controlling an airflow from an external environment into an interior of a cab of a work vehicle includes instructing, via a controller, a blower to operate at an initialization capacity to provide the airflow from the external environment into the interior of the cab at an output flow rate during an initialization phase. The method also includes receiving, via the controller, a first signal indicative of a pressure within the interior of the cab during the initialization phase. The method further includes determining, via the controller, a restriction factor based at least in part on the first signal during the initialization phase. In addition, the method includes receiving, via the controller, a second signal indicative of the pressure within the interior of the cab during an operation phase. The method also includes determining, via the controller, an input flow rate of the airflow from the external environment into the interior of the cab based at least in part on the restriction factor and the second signal during the operation phase. The method further includes instructing, via the controller, the blower and/or an airflow control assembly to control the airflow from the external environment into the interior of the cab based at least in part on the input flow rate during the operation phase. The airflow control assembly, upon receiving instructions from the controller, is configured to control the airflow from the external environment into the interior of the cab by adjusting a position of a door that controls mixing of external air from the external environment and recirculated air from the interior of the cab.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
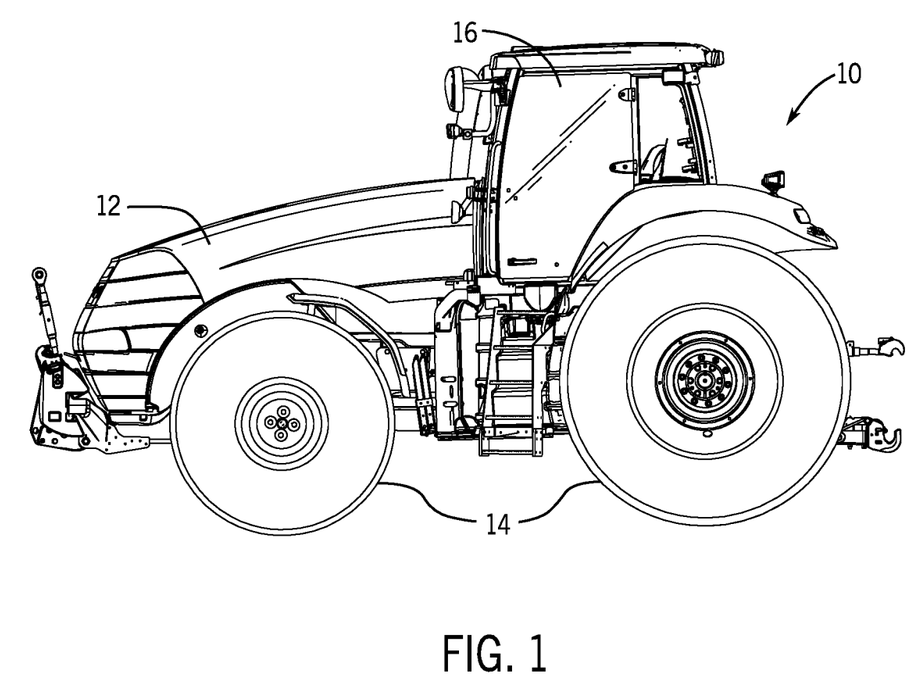
FIG. 1 is a side view of an embodiment of a work vehicle that may include an airflow control system.

Turn now to the drawings, FIG. 1 is a side view of an embodiment of a work vehicle 10 that may include an airflow control system. In the illustrated embodiment, the work vehicle 10 includes a body 12 configured to house an engine, a transmission, other systems of the work vehicle 10, or a combination thereof. In addition, the work vehicle 10 includes wheels 14 configured to be driven by the engine and transmission, thereby driving the work vehicle 10 along a field, a road, or any other suitable surface. In the illustrated embodiment, the work vehicle 10 includes a cab 16 configured to house an operator. As discussed in detail below, the work vehicle may include a heating, ventilation, and air conditioning (HVAC) system configured to control an air temperature within the cab and/or to pressurize the cab. Pressurizing the cab may substantially reduce ingress of dirt and/or other contaminants, enhance passenger comfort, reduce noise, or a combination thereof. In certain embodiments, the HVAC system includes an airflow control system configured to control airflow from an external environment into an interior of the cab, thereby controlling cab pressurization. While the illustrated work vehicle 10 is a tractor, it should be appreciated that the airflow control system described herein may be employed within any other suitable type of work vehicle, such as a harvester, a sprayer, or a skid steer, among others.

Figure 2:
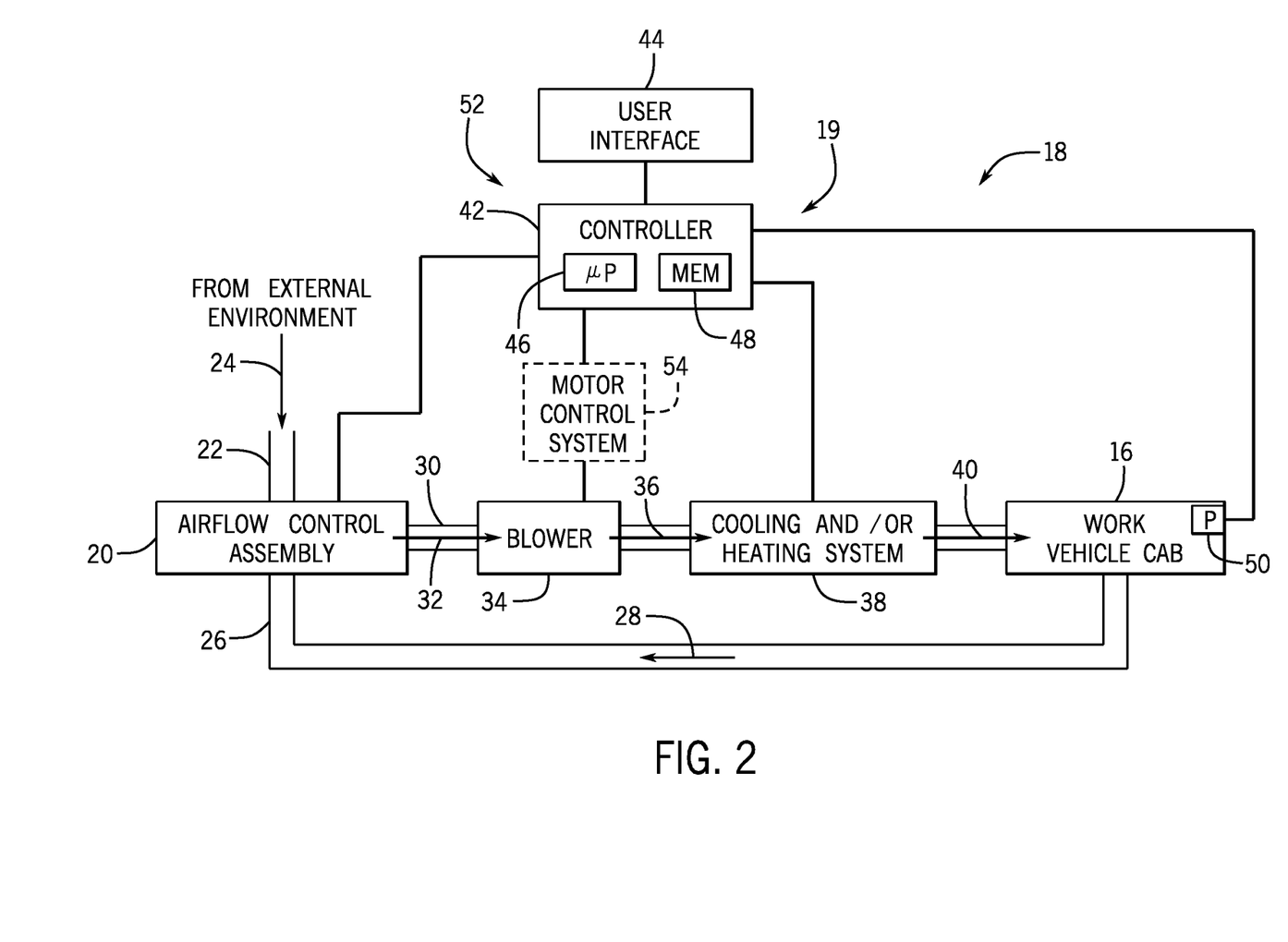
FIG. 2 is a schematic diagram of an embodiment of an airflow control system that may be employed within the work vehicle of FIG. 1.

FIG. 2 is a schematic diagram of an embodiment of an HVAC system 18 that may be employed within the work vehicle of FIG. 1. In the illustrated embodiment, the HVAC system 18 includes an airflow control system 19 configured to control airflow from an external environment into an interior of the work vehicle cab 16. The airflow control system 19 includes an airflow control assembly 20 configured to control mixing of air from an environment external to the cab (e.g., the external environment) and air recirculated from the cab. The airflow control assembly 20 includes a body having a first inlet 22 configured to receive an input airflow 24 from the external environment, and a second inlet 26 configured to receive a recirculation airflow 28 from the interior of the cab 16. The body of the airflow control assembly 20 also includes an outlet 30 configured to output an output airflow 32 toward the interior of the cab 16. In certain embodiments, the airflow control assembly includes a door disposed within the body and configured to move (e.g., rotate) relative to the body to control the input airflow through the first inlet and the recirculation airflow through the second inlet, thereby controlling mixing of the external air and the recirculated air. For example, while the door is in a first position, the recirculation airflow 28 may be substantially blocked, such that the output airflow 32 includes mostly air from the external environment (e.g., more than 95 percent, more than 97 percent, more than 98 percent, more than 99 percent, more than 99.5 percent, etc.). In addition, while the door is in a second position, the input airflow 24 may be substantially blocked, such that the output airflow 32 includes mostly recirculated air (e.g., more than 95 percent, more than 97 percent, more than 98 percent, more than 99 percent, more than 99.5 percent, etc.). And, while the door is in a position between the first and second positions, the output airflow 32 may include a mixture of air from the external environment and recirculated air.

In the illustrated embodiment, the airflow control system 19 includes a blower 34 configured to receive the output airflow 32 from the airflow control assembly 20 and to output a blower output airflow 36. In addition, the HVAC system 18 includes a cooling and/or heating system 38 configured to receive the blower output airflow 36 and to output a cab input airflow 40 having a higher or lower temperature than the blower output airflow 36. As illustrated, the cab input airflow 40 flows into the interior of the cab 16 of the work vehicle. During certain operating conditions, the cooling and/or heating system 38 may be deactivated. As a result, the temperature of the cab input airflow 40 may be substantially equal to the blower output airflow 36. The heating and/or cooling system 38 may include a heater core of a heating system and/or an evaporator of a refrigeration system, among other heating and/or cooling devices/systems. In certain embodiments, the cooling and/or heating system may be omitted, and the blower output airflow may flow directly into the interior of the cab 16.

In the illustrated embodiment, the airflow control system 19 includes a controller 42 communicatively coupled to the airflow control assembly 20, the blower 34, and the cooling and/or heating system 38. The controller 42 may be configured to instruct an actuator of the airflow control assembly to control the position of the door, thereby controlling the mixing of the external air and the recirculated air. In addition, the controller may be configured to control an output (e.g., capacity) of the blower, thereby controlling the flow rate of air into the interior of the cab. The controller may also be configured to control the cooling and/or heating system to control the temperature of the airflow into the interior of the cab. In the illustrated embodiment, the controller 42 is communicatively coupled to a user interface 44. The user interface 44 may be located within the cab of the work vehicle and configured to receive input from the operator, such as input for controlling the airflow control assembly, the blower, the cooling and/or heating system, or a combination thereof.

In certain embodiments, the controller 42 is an electronic controller having electrical circuitry configured to process data from certain components of the HVAC system 18, such as the user interface 44. The controller 42 includes a processor, such as the illustrated microprocessor 46, and a memory device 48. The controller 42 may also include one or more storage devices and/or other suitable components. The processor 46 may be used to execute software, such as software for controlling the airflow control system 19, and so forth. Moreover, the processor 46 may include multiple microprocessors, one or more "general-purpose" microprocessors, one or more special-purpose microprocessors, and/or one or more application specific integrated circuits (ASICS), or some combination thereof. For example, the processor 46 may include one or more reduced instruction set (RISC) processors.

The memory device 48 may include a volatile memory, such as random access memory (RAM), and/or a nonvolatile memory, such as read-only memory (ROM). The memory device 48 may store a variety of information and may be used for various purposes. For example, the memory device 48 may store processor-executable instructions (e.g., firmware or software) for the processor 46 to execute, such as instructions for controlling the airflow control system 19, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the airflow control system, etc.), and any other suitable data.

In the illustrated embodiment, the airflow control system 19 includes a pressure sensor 50 fluidly coupled to the interior of the cab 16. The pressure sensor 50 is communicatively coupled to the controller 42 and configured to output signals indicative of pressure within the interior of the cab 16. As discussed in detail below, the controller 42 is configured to determine a restriction factor, which is a quantitative representation of sealing efficiency of the cab, based in part on a signal from the pressure sensor 50. In addition, the controller 42 is configured to determine an input flow rate of the airflow from the external environment into the interior of the cab based at least in part on the restriction factor and the pressure within the interior of the cab. Once the input flow rate is determined, the controller 42 may control the blower 34 and/or the airflow control assembly 20 based at least in part on the determined input flow rate.

In certain embodiments, the controller 42 is configured to initiate an initialization phase, in which the controller determines the restriction factor. For example, the controller 42 may automatically initiate the initialization phase during end-of-line testing of the work vehicle. End-of-line testing may be performed after (e.g., immediately after) the work vehicle manufacturing process is complete (e.g., at the end of the assembly line). In certain embodiments, the controller 42 is an element of an automatic temperature control system 52. In such embodiments, the controller 42 may automatically initiate the initialization phase while the automatic temperature control system 52 is performing self-testing during the end-of-line testing. The end-of-line testing and/or the self-testing of the automatic temperature control system 52 may be initiated by an operator (e.g., assembly line technician) or by an automated system (e.g., a control system communicatively coupled to the automatic temperature control system during and/or after the work vehicle manufacturing process, etc.).

During the initialization phase, the controller 42 instructs the blower 34 to operate at an initialization capacity, such that the blower outputs the blower output airflow 36 at an output flow rate (e.g., initialization flow rate). For example, the controller 42 may output an initialization voltage to the blower 34, or the controller 42 may instruct a motor controller 54, which is communicatively coupled to the controller 42 and the blower 34, to output an initialization voltage. The initialization voltage may drive the blower 34 to operate at the initialization capacity, thereby outputting the airflow 36 at the output/initialization flow rate. However, it should be appreciated that in alternative embodiments, the capacity of the blower may be controlled by other inputs (e.g., instead of or in addition to the voltage input), such as a hydraulic fluid flow rate for a blower driven by a hydraulic motor and/or an angle of blades within the blower, among others. The controller 42 may receive a signal from the pressure sensor 50 indicative of the pressure within the interior of the cab 16. The controller 42 may then determine the restriction factor based at least in part on the signal/pressure within the interior of the cab. For example, as discussed in detail below, the restriction factor may be determined based on a relationship between the output flow rate and the pressure within the interior of the cab associated with operating the blower at the initialization capacity.

The restriction factor is a quantitative representation of the sealing quality of the cab. For example, a tight (e.g., well sealed) cab may have a restriction factor of about 0.065 $Pa/(m^3/h)^2$, and a loose (e.g., poorly sealed) cab may have a restriction factor of about 0.005 $Pa/(m^3/h)^2$. The restriction factor varies between work vehicle cabs based on the alignment of seals (e.g., gaskets, o-rings, etc.) and/or the alignment of components (e.g., doors, windows, panels, etc.) of the work vehicle cab, among other factors. Determining the restriction factor during the initialization phase enables the controller to determine the input flow rate of the airflow from the external environment into the interior of the cab based at least in part on the measured pressure within the interior of the cab. For example, the input flow rate of the airflow from the external environment into the interior of the cab may be proportional to the square root of the pressure divided by the square root of the restriction factor.

In certain embodiments, the controller 42 may instruct the airflow control assembly 20 to move the door to the first position (e.g., target position) before instructing the blower 34 to operate at the initialization capacity. As a result, most of the blower output airflow (e.g., more than 95 percent, more than 97 percent, more than 98 percent, more than 99 percent, more than 99.5 percent, etc.) includes air from the external environment (e.g., because recirculated air may not significantly affect the pressure within the interior of the cab). However, it should be appreciated that in certain embodiments, the controller may instruct the door to transition to an intermediate position (e.g., target position) between the first and second positions. In such embodiments, the controller may determine the restriction factor based at least in part on the pressure within the interior of the cab and the position of the door. In further embodiments, the door may be manually or automatically moved prior to initiation of the initialization phase, or the door may not be moved (e.g., the door may remain in a default position). In such embodiments, the controller may determine the restriction factor based at least in part on the pressure within the interior of the cab and the position of the door.

During operation of the work vehicle (e.g., during the operation phase of the airflow control system), the pressure sensor 50 outputs a signal indicative of the pressure within the interior of the cab 16. The controller 42 receives the signal and determines the input flow rate of the airflow from the external environment into the interior of the cab 16 based at least in part on the restriction factor and the pressure within the interior of the cab. As previously discussed, the pressure within the interior of the cab may be proportional to the restriction factor multiplied by the square of the input flow rate. Accordingly, the controller 42 may determine the input flow rate based at least in part on the restriction factor and the pressure within the interior of the cab. As a result, an airflow sensor (e.g., a mass airflow sensor, a volumetric airflow sensor, etc.) may be obviated, thereby reducing the cost and complexity of the airflow control system. Once the input flow rate is determined, the controller 42 may instruct the blower 34 and/or the airflow control assembly to control the airflow from the external environment into the interior of the cab based at least in part on the input flow rate. For example, the controller 42 may instruct the blower 34 (e.g., via the motor control system 52) and/or the airflow control assembly 20 to control the airflow such that the input flow rate is within a threshold range of a target input flow rate.

For example, in certain embodiments, the airflow control system may include a filter positioned at the first inlet to the airflow control assembly. The filter may be configured to filter the air from the external environment to substantially block dust and/or other contaminants from entering the interior of the cab. As the filter becomes clogged, the airflow provided by the blower may be reduced. For example, if the controller instructs the blower to provide the airflow from the external environment into the interior of the cab at the target input flow rate (e.g., while the door of the airflow control assembly is in a target position, such as the first position), the determined input flow rate may be less than the target input flow rate due to the clogged filter. Accordingly, the controller may instruct the blower to increase capacity until the determined input flow rate is within a threshold range of the target input flow rate, thereby compensating for the clogged filter.

Figure 3:
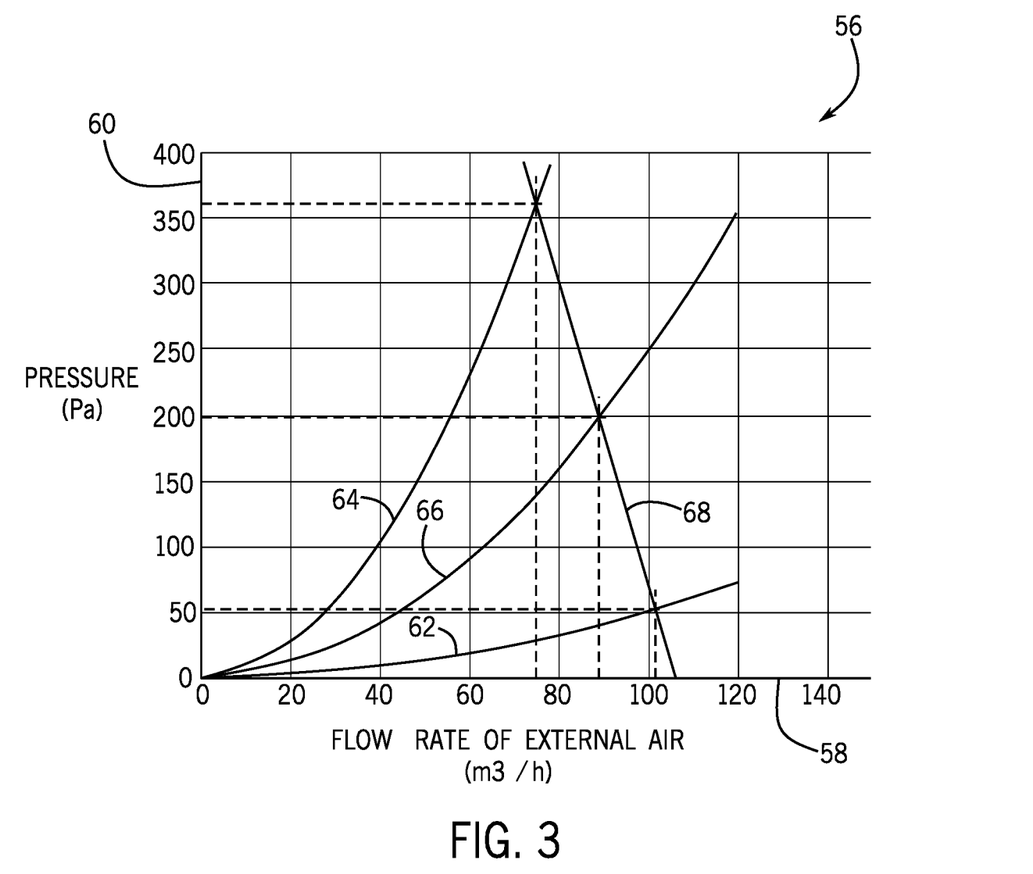
FIG. 3 is a graph of an embodiment of cab pressure curves.

FIG. 3 is a graph 56 of an embodiment of cab pressure curves. In certain embodiments, the graph (e.g., data representative of the curves, equations representative of the curves, etc.) may be stored within the memory of the controller. In the illustrated embodiment, the graph 56 includes an x-axis 58 representative of flow rate of the airflow from the external environment into the interior of the cab, and a y-axis 60 representative of pressure within the interior of the cab. A first curve 62 represents the relationship between the pressure within the interior of the cab and the flow rate of the airflow for a loose (e.g., poorly sealed) cab (e.g., a cab having a restriction factor of about 0.005 Pa/(m$^3$/h)$^2$). In addition, a second curve 64 represents the relationship between the pressure within the interior of the cab and the flow rate of the airflow for a tight (e.g., well sealed) cab (e.g., a cab having a restriction factor of about 0.065 Pa/(m$^3$/h)$^2$). Furthermore, a third curve 66 represents the relationship between the pressure within the interior of the cab and the flow rate of the airflow for a cab having a target restriction factor (e.g., about 0.03 Pa/(m$^3$/h)$^2$). A cab having a target restriction factor may reduce the power utilized by the blower to achieve a target pressure within the interior of the cab (e.g., to reduce noise, to enhance passenger conform etc.), as compared to a loose cab. Moreover, a cab having a target restriction factor may reduce the power utilized by the blower to achieve the target input flow rate of the airflow from the external environment into the interior of the cab (e.g., to substantially reduce ingress of dirt and/or other contaminants into the cab), as compared to a tight cab. While three constant restriction factor curves (e.g., the first curve, the second curve, and the third curve) are included in the illustrated graph, it should be appreciated that the graph may include more or fewer constant restriction factor curves.

As illustrated, the graph 56 includes a fourth curve 68 representative of the relationship between the pressure within the interior of the cab and the flow rate of the airflow from the external environment into the interior of the cab while the blower is operated at the initialization capacity (e.g., the capacity associated with the initialization voltage). The fourth curve 68 may be generated by instructing the blower to operate at the initialization capacity, manually adjusting the restriction factor, and then measuring the resultant pressure within the interior of the cab and the resultant flow rate of the airflow (e.g., while a filter disposed at the first inlet to the airflow control assembly is substantially clean). For example, the fourth curve 68 may be generated based on bench testing and/or any other suitable process (e.g., performed on a test cab) prior to beginning the initialization phase. Once generated, the fourth curve 68 may be utilized to determine the restriction factor for multiple work vehicle cabs. In certain embodiments, the door of the airflow control assembly may be moved to a target position (e.g., the first position) before the fourth curve is generated. In such embodiments, the door may be moved to the same target position during/before the initialization process.

To determine the restriction factor during the initialization phase, the controller may identify a point on the fourth curve 68 corresponding to the measured pressure within the interior of the cab. The controller may then identify a constant restriction factor curve (e.g., the first curve, the second curve, the third curve, etc.) that interests the fourth curve 68 at the identified point. The restriction factor of the cab may correspond to the restriction factor of the constant restriction factor curve. While the controller determines the restriction factor based on curves in the illustrated embodiment, it should be appreciated that in alternative embodiments, the controller may determine the restriction factor based on a lookup table, an empirical equation, an analytical equation, any other suitable indicator of the relationship between the output flow rate and the pressure within the interior of the cab associated with operating the blower at the initialization capacity, or a combination thereof. During the operation phase, the controller may utilize the constant restriction factor curve corresponding to the determined restriction factor to determine the input flow rate based on the pressure within the interior of the cab (e.g., by identifying a point on the curve corresponding to the pressure within the interior of the cab and identifying the flow rate at the identified point).

Figure 4:
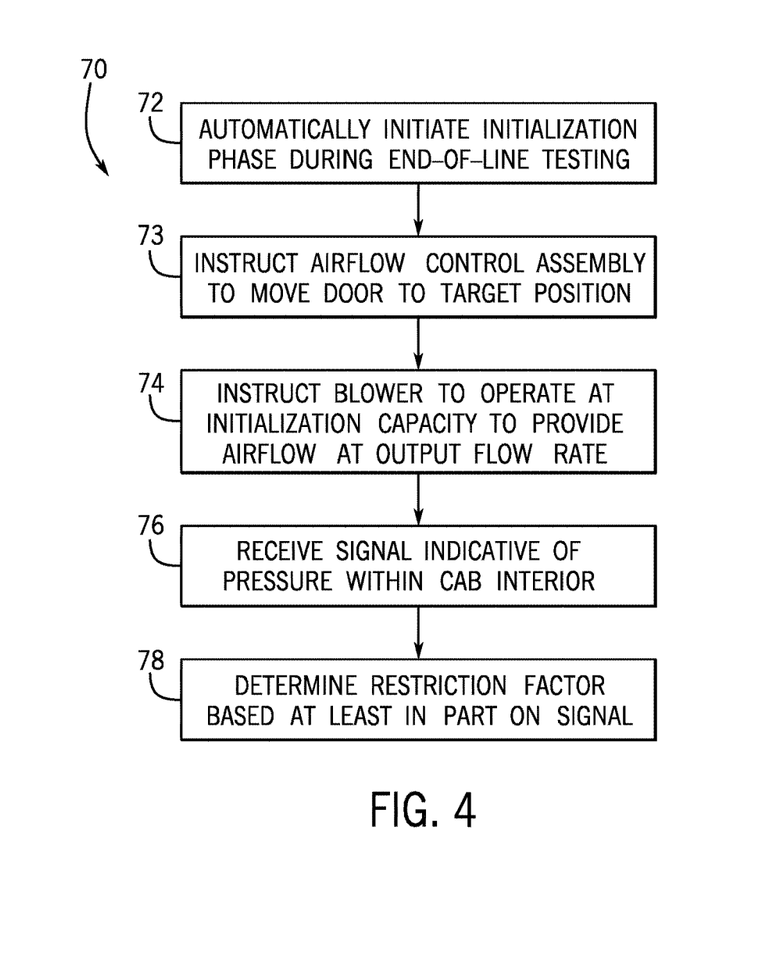
FIG. 4 is a flow diagram of an embodiment of a method for determining a restriction factor during an initialization phase.

FIG. 4 is a flow diagram of an embodiment of a method 70 for determining the restriction factor during the initialization phase. In the illustrated embodiment, as represented by block 72, the initialization phase is automatically initiated during end-of-line testing. However, it should be appreciated that in alternative embodiments, the initialization phase may be initiated based on user input, based on feedback from a sensor, any other suitable initiation condition, or a combination thereof. In the illustrated embodiment, the airflow control assembly is instructed to move the door to a target position, such as the first position, before the blower is instructed to operate at the initialization capacity, as represented by block 73. However, in alternative embodiments, the door may be manually or automatically moved to the target position before the initialization phase is initiated, or the door may not be moved (e.g., the door may remain in a default position). As represented by block 74, the blower is instructed to operate at the initialization capacity to provide the airflow at the output/initialization flow rate. For example, as previously discussed, the controller may output an initialization voltage to the blower, or the controller may instruct a motor control system to output the initialization voltage. The initialization voltage may drive the blower to operate at the initialization capacity, thereby providing the airflow at the output/initialization flow rate. As represented by block 76, a signal indicative of the pressure within the interior of the cab is received. As previously discussed, the signal may be output by a pressure sensor fluidly coupled to the interior of the cab. Next, as represented by block 78, the restriction factor is determined based at least in part on the signal/pressure within the interior of the cab. For example, the controller may utilize a relationship (e.g., stored within the memory of the controller, such as a graph, a lookup table, an equation, etc.) between the output flow rate and the pressure within the interior of the cab associated with operating the blower at the initialization capacity to determine the restriction factor.

Figure 5:
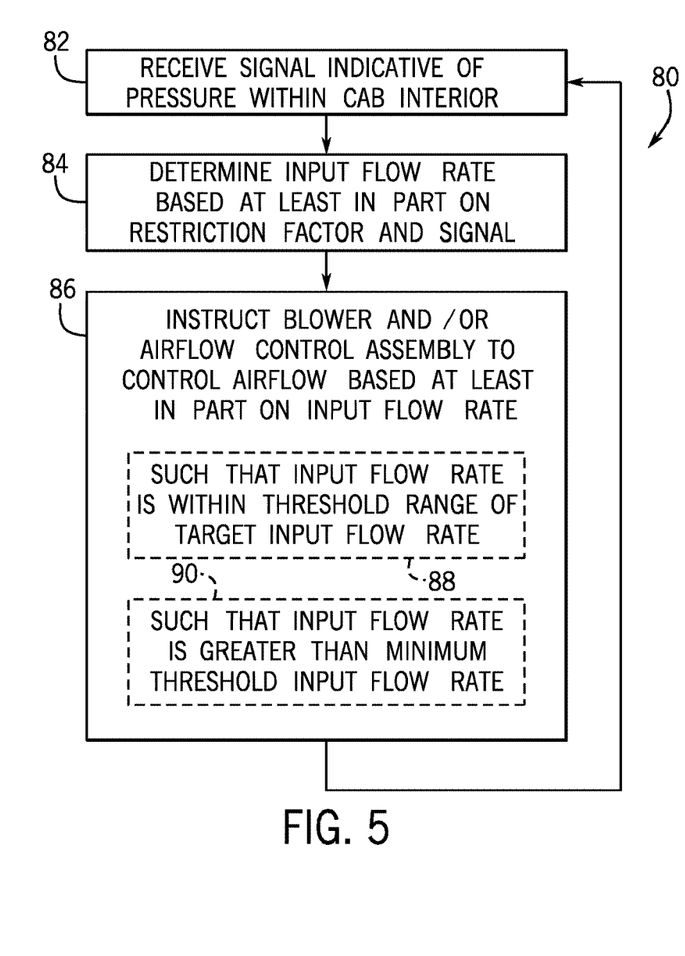
FIG. 5 is a flow diagram of an embodiment of a method for controlling airflow from an external environment into an interior of the cab during an operation phase.

FIG. 5 is a flow diagram of an embodiment of a method 80 for controlling airflow from the external environment into the interior of the cab during the operation phase. First, as represented by block 82, a signal indicative of pressure within the interior of the cab is received. The signal indicative of pressure may be output by a pressure sensor fluidly coupled to the interior of the cab. An input flow rate of the airflow from the external environment into the interior of the cab is then determined based at least in part on the restriction factor, which is determined during the initialization phase, and the signal/pressure within the interior of the cab, as represented by block 84. The input flow rate may be determined based at least in part on a relationship (e.g., stored in the memory of the controller) between the pressure within the interior of the cab and the input flow rate of the airflow from the external environment into the interior of the cab for the determined restriction factor. Next, as represented by block 86, the blower and/or the airflow control assembly are instructed to control the airflow from the external environment into the interior of the cab based at least in part on the input flow rate. For example, the blower and/or the airflow control assembly may be instructed to control the airflow from the external environment into the interior of the cab such that the input flow rate is within a threshold range of a target input flow rate, as represented by block 88. In addition, the blower and/or the airflow control assembly may be instructed to control the airflow from the external environment into the interior of the cab such that the input flow rate is greater than a minimum threshold input flow rate, as represented by block 90.

In the embodiments disclosed herein, the blower and/or the airflow control assembly is controlled based at least in part on the input flow rate. However, it should be appreciated that in certain embodiments, the blower and/or the airflow control assembly may be controlled based at least in part on the input flow rate and the pressure within the interior of the cab. For example, in certain embodiments, the controller may be configured to instruct the blower and/or the airflow control assembly to increase or decrease the pressure within the cab. By way of example, if the pressure within the cab is below a threshold pressure, the controller may instruct the blower to increase capacity, thereby increasing the input flow rate of the airflow from the external environment into the interior of the cab and increasing the pressure within the interior of the cab (e.g., in embodiments in which the controller is configured to instruct the blower and/or the airflow control assembly to control the airflow such that the input flow rate is greater than the minimum threshold input flow rate).

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An airflow control system of a work vehicle, comprising:
 a controller having a memory and a processor, wherein during an initialization phase, the controller is configured to:
  instruct a blower to operate at an initialization capacity to provide an airflow from an external environment into an interior of a cab of the work vehicle at an output flow rate;
  receive a first signal indicative of a pressure within the interior of the cab; and
  determine a restriction factor based at least in part on the first signal, wherein the restriction factor is a quantitative representation of sealing efficiency of the cab; and
 wherein during an operation phase, the controller is configured to:
  receive a second signal indicative of the pressure within the interior of the cab;
  determine an input flow rate of the airflow from the external environment into the interior of the cab based at least in part on the restriction factor and the second signal; and
  instruct the blower, an airflow control assembly, or a combination thereof, to control the airflow from the external environment into the interior of the cab based at least in part on the input flow rate, wherein the airflow control assembly, upon receiving instructions from the controller, is configured to control the airflow from the external environment into the interior of the cab by adjusting a position of a door that controls mixing of external air from the external environment and recirculated air from the interior of the cab.

2. The airflow control system of claim 1, comprising a pressure sensor configured to fluidly couple to the interior of the cab and to output the first and second signals indicative of the pressure within the interior of the cab.

3. The airflow control system of claim 1, wherein during the operation phase, the controller is configured to instruct the blower, the airflow control assembly, or the combination thereof, to control the airflow from the external environment into the interior of the cab such that the input flow rate is within a threshold range of a target input flow rate.

4. The airflow control system of claim 1, wherein the controller is configured to automatically initiate the initialization phase during end-of-line testing of the work vehicle.

5. The airflow control system of claim 1, wherein the controller is an element of an automatic temperature control system of the work vehicle.

6. The airflow control system of claim 1, wherein the airflow control system does not include an airflow sensor.

7. The airflow control system of claim 1, wherein during the initialization phase, the controller is configured to instruct the blower to operate at the initialization capacity by outputting or instructing a motor control system to output an initialization voltage.

8. An airflow control system of a work vehicle, comprising:
 a controller having a memory and a processor, the memory having a stored pressure/flow rate relationship for varying restriction factors at a system initialization capacity;
 wherein during an initialization phase, the controller is configured to:
  instruct a blower to operate at the system initialization capacity to provide an airflow from an external environment into an interior of a cab of the work vehicle at an initialization flow rate;
  receive a first signal indicative of a cab interior pressure within the interior of the cab; and
  determine a restriction factor based on the first signal by selecting a constant restriction factor curve that intersects the stored pressure/flow rate relationship at the cab interior pressure, wherein the restriction factor is a quantitative representation of sealing efficiency of the cab; and
 wherein during an operation phase, the controller is configured to:
  receive a second signal indicative of the cab interior pressure;
  determine a determined operation flow rate of the airflow from the external environment into the interior of the cab based on the restriction factor determined in the initialization phase and the second signal, and without input from an airflow sensor; and
  control the blower, an airflow control assembly, or a combination thereof, such that the determined operation flow rate is within a threshold range of a target operation flow rate or such that the determined operation flow rate is greater than a minimum threshold operation flow rate, wherein the airflow control assembly, in response to input from the controller, is configured to control the airflow from the external environment into the interior of the cab by adjusting a position of an airflow control assembly door that controls mixing of external air from the external environment and recirculated air from the interior of the cab;
 wherein the airflow control system does not include the airflow sensor.

9. The airflow control system of claim 8, comprising a pressure sensor configured to fluidly couple to the interior of the cab and to output the first and second signals indicative of the cab interior pressure.

10. The airflow control system of claim 8, wherein the controller is configured to automatically initiate the initialization phase during end-of-line testing of the work vehicle.

11. The airflow control system of claim 8, wherein the controller is an element of an automatic temperature control system of the work vehicle.

12. The airflow control system of claim 8, wherein during the initialization phase, the controller is configured to instruct the blower to operate at the system initialization capacity by outputting or instructing a motor control system to output an initialization voltage.

\* \* \* \* \*